(12) United States Patent
Oh et al.

(10) Patent No.: US 7,688,414 B2
(45) Date of Patent: Mar. 30, 2010

(54) METHOD FOR FABRICATING A LIQUID CRYSTAL DISPLAY DEVICE AND AN LCD DEVICE THEREBY

(75) Inventors: Jae Young Oh, Seoul (KR); Young Seung Jee, Anyang-si (KR); Jeong Oh Kim, Seoul (KR); Soopool Kim, Seoul (KR)

(73) Assignee: LG Display Co., Ltd, Seoul (KR)

( * ) Notice: Subject to any disclaimer, the term of this patent is extended or adjusted under 35 U.S.C. 154(b) by 172 days.

(21) Appl. No.: 11/812,949

(22) Filed: Jun. 22, 2007

(65) Prior Publication Data

US 2008/0123044 A1 May 29, 2008

(30) Foreign Application Priority Data

Jun. 23, 2006 (KR) .................... 10-2006-0056848

(51) Int. Cl.
*G02F 1/1343* (2006.01)
*G02F 1/13* (2006.01)

(52) U.S. Cl. .................. 349/141; 349/143; 349/187

(58) Field of Classification Search ........... 349/141, 349/143, 187
See application file for complete search history.

(56) References Cited

U.S. PATENT DOCUMENTS

| 6,445,438 | B1 * | 9/2002 | Horie et al. ............... 349/187 |
| 7,351,600 | B2 * | 4/2008 | Yoo et al. ................... 438/30 |
| 7,371,783 | B2 * | 5/2008 | Tatsuzawa et al. ........ 522/176 |
| 2004/0195590 | A1 * | 10/2004 | Suzawa et al. ............ 257/200 |
| 2005/0002260 | A1 * | 1/2005 | Koyama ..................... 365/222 |
| 2005/0074563 | A1 * | 4/2005 | Tatsuzawa et al. ......... 428/1.1 |
| 2006/0014335 | A1 * | 1/2006 | Ohnuma et al. ............ 438/155 |
| 2006/0138426 | A1 * | 6/2006 | Yoo et al. ................... 257/72 |
| 2006/0220544 | A1 * | 10/2006 | Okuyama et al. .......... 313/506 |
| 2007/0070284 | A1 * | 3/2007 | Lee et al. .................... 349/153 |

* cited by examiner

*Primary Examiner*—K. Cyrus Kianni
(74) *Attorney, Agent, or Firm*—McKenna Long & Aldridge LLP

(57) ABSTRACT

A method for fabricating a LCD having enhanced aperture ratio and brightness includes: forming a gate line, a gate electrode, a common electrode and a common line in a first mask process; depositing a gate insulating layer covering the gate line, the gate electrode and the common electrode; forming an active layer on the gate insulating layer, and an ohmic contact layer on the active layer in a second mask process; forming a data line, a source electrode, and a drain electrode facing the source electrode in a third mask process; depositing a protective layer over the data line, the source electrode and the drain electrode; forming a pixel contact hole in a fourth mask process; and forming a pixel electrode, wherein the pixel electrode is connected to the drain electrode through the pixel contact hole in a fifth mask process using a reverse tapered photo-resist pattern.

2 Claims, 27 Drawing Sheets

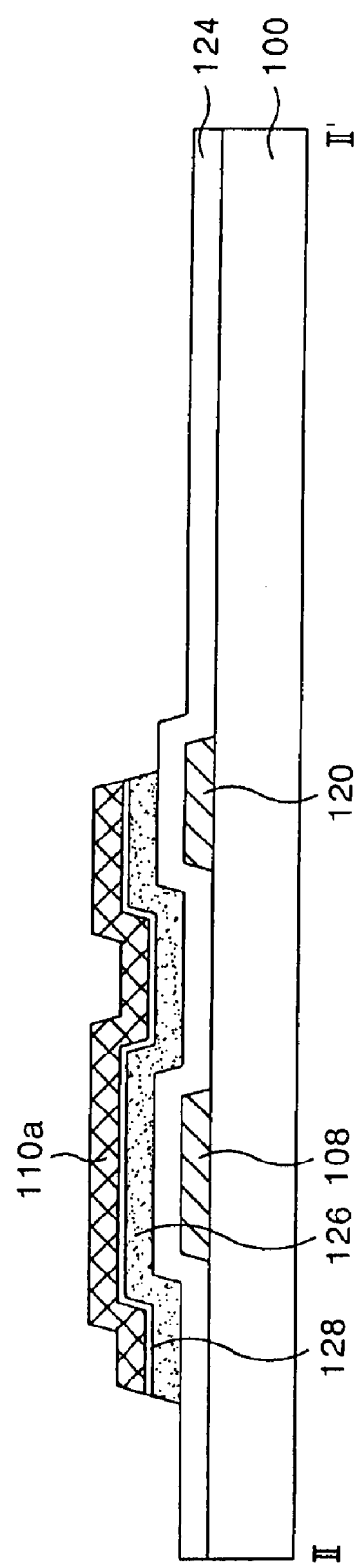

METHOD FOR FABRICATING A LIQUID CRYSTAL DISPLAY DEVICE AND AN LCD DEVICE THEREBY

This application claims the benefit of Korean Application No. 10-2006-056848 filed on Jun. 23, 2006, which is hereby incorporated by reference all purposes as if fully set forth.

BACKGROUND OF THE INVENTION

1. Field of the Invention

The present invention relates to a liquid crystal display device and a method for fabricating the same. More particularly, the present invention relates to a method for fabricating a liquid crystal display ("LCD") in which an aperture ratio and brightness are enhanced.

2. Discussion of the Related Art

The liquid crystal display (LCD) device displays includes a color filter array panel and a thin film transistor ("TFT") array panel facing each other with a liquid crystal layer between them. The color filter array panel includes a black matrix for blocking the light leakage, a color filter of red, blue and green, and a leveling layer for leveling the surface of the upper substrate. As illustrated in FIG. 1, the TFT array substrate includes a gate line 2 and a data line 4 crossing each other on a lower substrate, a TFT 30 at the crossing portion of the gate and data lines, and a pixel electrode 18 formed in the pixel region surrounded by the gate line 2 and the data line 4.

The TFT 30 acts as a switch to supply an electric signal to the pixel electrode 18. In the pixel area, a common electrode 22 generates a horizontal electric field with the pixel electrode 18 to drive the liquid crystal layer, and a common line 20 connects a plurality of common electrode 22.

In addition, the TFT array panel includes a gate pad (not shown) at the end of the gate line 2 and a data pad (not shown) at the end of the data line 4. A scan signal is supplied to the gate line 2 from a gate drive IC (not shown) connected to the gate pad. A video data signal is supplied to the data line 4 from a data drive IC (not shown) connected to the data pad.

The TFT 30 charges the video data signal supplied through the data line 4 to the pixel electrode 18 by responding to the scan signal supplied through the gate line 2. Therefore, the TFT 30 includes a gate electrode 8 connected to the gate line 2, a source electrode 10 connected to the data line 4, and a drain electrode 12 facing the source electrode 10 and connected to the pixel electrode 18 through the contact hole 32. The common line 20 supplies the base electric voltage to the common electrode 22 for generating the horizontal electric filed with the video data signal supplied to the pixel electrode 18 to drive the liquid crystal layer.

The common electrode 20 disposed in the pixel area of the LCD device is made of the same material as the gate line 2 and common line 20, the conductive metal material not transparent the light. Further, the pixel electrode 18 may include an opaque conductive metal material for reducing the line resistance. By the pixel electrode 18 and the common electrode 20 having an opaque material, the aperture ratio of the pixel region will be degraded. As a result, the brightness of the LCD device is degraded also.

SUMMARY OF THE INVENTION

Accordingly, the present invention is directed to a method for fabricating a LCD device and the LCD in which the aperture ration of the pixel region is increased and the brightness of the LCD is enhanced by making the pixel electrode and the common electrode have the thinnest width while maintaining an optimized electric property.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, a method for fabricating a liquid crystal display device, comprises: forming a gate line, a gate electrode connected to the gate line, a common electrode and a common line connected to the common electrode on a substrate in a first mask process; depositing a gate insulating layer on the substrate to cover the gate line, the gate electrode and the common electrode; forming an active layer on the gate insulating layer, the active layer overlapping the gate electrode to form a channel layer, and forming an ohmic contact layer on the active layer in a second mask process; forming a data line crossing the gate line to define a pixel region, a source electrode connected to the data line, and a drain electrode facing with the source electrode in a third mask process; depositing a protective layer over the data line, the source electrode and the drain electrode; forming a pixel contact hole that exposes the drain electrode by penetrating the protective layer in a fourth mask process; and forming a pixel electrode that generates a horizontal electric field with the common electrode in the pixel region, wherein the pixel electrode is connected to the drain electrode through the pixel contact hole in a fifth mask process using a reverse tapered photo-resist pattern.

In another embodiment of the present invention, a method for fabricating a liquid crystal display device, comprises: forming a gate line, a gate electrode connected to the gate line, a common electrode and a common line connected the common electrode on a substrate in a first mask process; depositing a gate insulating layer on the substrate to cover the gate line, the gate electrode and the common electrode; forming an active layer on the gate insulating layer, the active layer overlapping the gate electrode to form a channel layer, and forming an ohmic contact layer on the active layer, a data line crossing with the gate line to define a pixel region and a source-drain pattern connecting to the data line in a second mask process; depositing a protective layer over the data line, the source electrode and the drain electrode; patterning the source-drain pattern to form a source electrode and a drain electrode, completing the channel layer by removing a portion of the ohmic contact layer between the source electrode and the drain electrode, and forming a pixel contact hole exposing the drain electrode by penetrating the protective layer in a third mask process; and forming a pixel electrode that generates a horizontal electric field with the common electrode in the pixel region, wherein the pixel electrode connects to the drain electrode through the pixel contact hole in a fourth mask process using a reverse tapered photo-resist pattern.

In still another embodiment of the present invention, a method for fabricating a liquid crystal display device, comprises: forming a gate line and a gate electrode connected to the gate line on a lower substrate using a reverse tapered photo-resist pattern; forming a data line crossing the gate line to define a pixel region, a source electrode connected to the data line, and a drain electrode facing the source electrode on the lower substrate using a reverse tapered photo-resist pattern; forming a pixel electrode in the pixel region connecting to the drain electrode on the lower substrate; and forming a common electrode on a upper substrate facing the lower substrate to form a vertical electric field with the pixel electrode.

In another embodiment, a liquid crystal display device comprises a gate line and a data line crossing each other to define a pixel region on a lower substrate; a TFT disposed at the crossing portion of the gate line and the data line; a pixel electrode connected to the TFT in the pixel region; a common electrode in the pixel region facing the pixel electrode to generate an in-plane electric field; and a common line connected to the common electrode to supply a base electric voltage to the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 14A and 14B illustrate a plan view and a cross sectional view describing the second mask process of a method for fabricating a TFT array panel according to the second embodiment of the present invention;

DETAILED DESCRIPTION OF THE ILLUSTRATED EMBODIMENTS

Reference will now be made in detail to embodiments of the present invention, examples of which are illustrated in the accompanying drawings.

Figure 1:
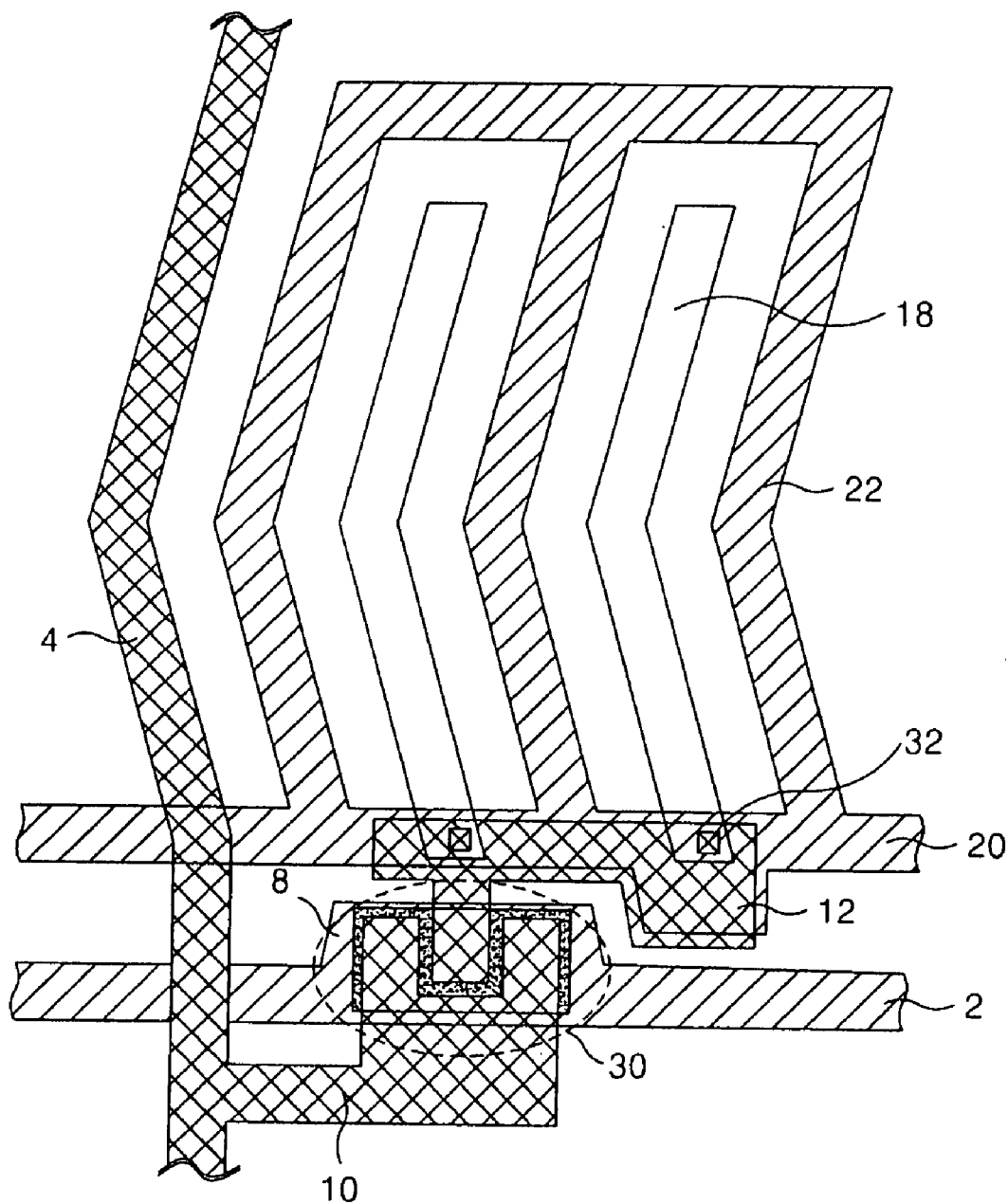
FIG. 1 illustrates a plan view of the TFT array panel according to the related art.
Figure 2:
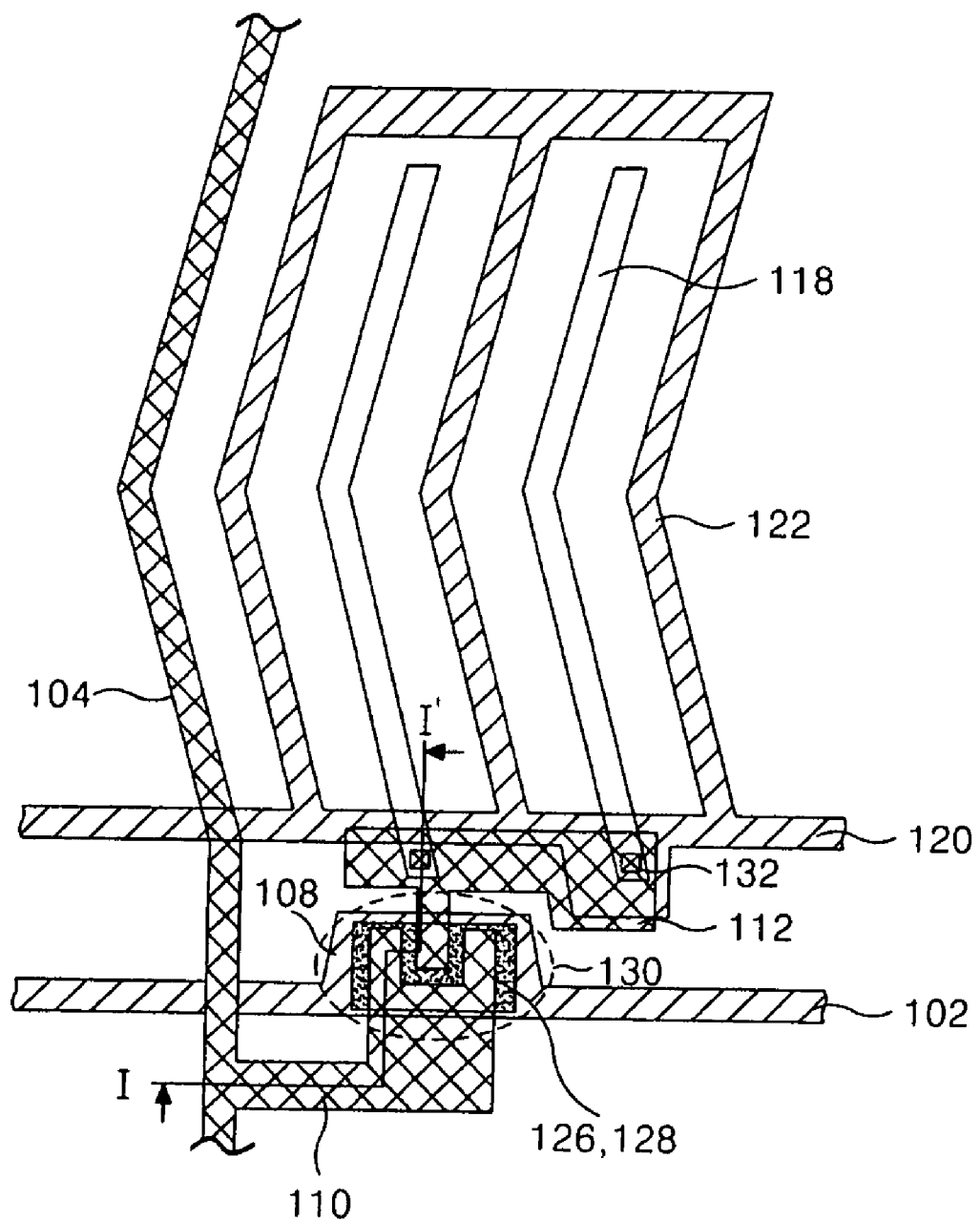
FIG. 2 illustrates a plan view of a TFT array panel according to the first embodiment of the present invention.
Figure 3:
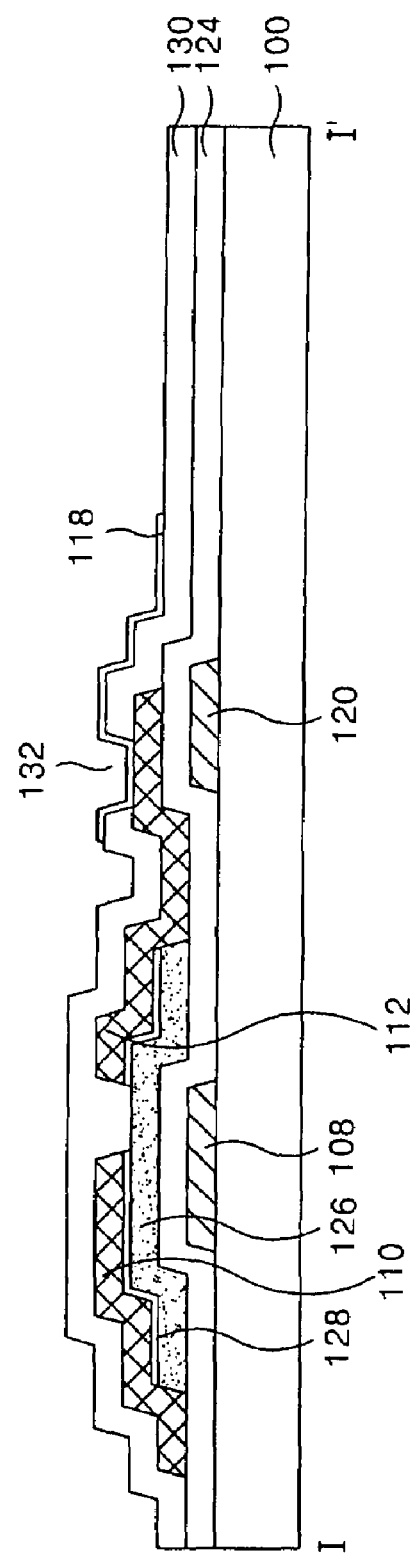
FIG. 3 illustrates a cross sectional view along the cutting line I-I' of the TFT array panel according to the first embodiment.

FIG. 2 is a plan view illustrating the TFT array panel according to the present invention. FIG. 3 is a cross sectional view of the TFT array panel shown in FIG. 2 along the cutting line I-I'.

Referring to the FIGS. 2 and 3, the TFT array panel according to the present invention includes a gate line 102 and a data line 104 crossing each other with a gate insulating layer 124 between them to define a pixel region on a lower substrate 100; a pixel electrode 118 and a common electrode 122 generating a horizontal electric field in the pixel area; a TFT 130 connected to the gate line 102, the data line 104 and the pixel electrode 118; and a common line 120 connected to the common electrode 122. Further, the TFT array panel includes a storage capacitor 140 formed at the overlap area between common line 120 and the drain electrode 122 with the gate insulating layer 124 between them, a gate pad (not shown) at the end of the gate line 102, and a data pad (not shown) at the end of the data line 104.

The scan signal is supplied to the gate line 102 from the gate drive IC (not shown) connected to the gate pad. The video data signal is supplied to the data line 104 from the data drive IC (not shown) connected to the data pad. The TFT 130 charges the video data signal supplied from the data line 104 to the pixel electrode 118 responding to the scan signal supplied from the gate line 102. The TFT 130 functions as a switch to supply the video data signal to the pixel electrode from the data line and includes a gate electrode 108 connected to the gate line 102, a source electrode 110 connected to the data line 104, a drain electrode 112 facing the source electrode 110 and connected to the pixel electrode 118 through the pixel contact hole 132, an active layer 126 overlapping the gate electrode 108 with the gate insulating layer 124 and forming a channel between the source electrode 110 and the drain electrode 112, and a ohmic contact layer 128 reducing the contact resistance between the active layer 126 and the source electrode 110 or the drain electrode 112.

The common line 120 supplies the base voltage to the common electrode 122 for generating the horizontal electric field by corresponding to the video data signal supplied to the pixel electrode 118. The pixel electrode 118 and the common electrode 122 are disposed substantially in parallel to each other within the pixel region which is surrounded by the gate line 102 and the data line 104 crossing each other.

The pixel electrode 118 is made of, for example, a transparent conductive material including ITO (Indium Tin Oxide), IZO (Indium Zinc Oxide) or ITZO (Indium Tin Zinc Oxide). To reduce the electric resistance of the pixel electrode 118, the pixel electrode 118 may further include a non-transparent conductive material such as molybdenum (Mo), Titanium (Ti), Copper (Cu), Aluminum Neodium (AlNd), Chromium (Cr), Molybdenum alloy, Copper alloy or Aluminum alloy. The common electrode 122 is generally made of, for examples, a non-transparent conductive material including molybdenum (Mo), Titanium (Ti), Copper (Cu), Aluminum Neodium (AlNd), Chromium (Cr), Molybdenum alloy, Copper alloy or Aluminum alloy.

The pixel electrode 118 and the common electrode 122, as shown in FIG. 2, may be formed in a linear line shape, a zigzag shape or other shapes with the data line 104. Further, the pixel electrode 118 and the common electrode 122 may be formed in the zigzag shape, while the data line 104 is formed in the linear line shape. The conductive line patterns of the TFT array panel according to the present invention such as the pixel electrode 118, the common electrode 122, the gate line 102 and the data line 104 are formed with the reverse tapered photo-resist pattern.

Figure 4A:
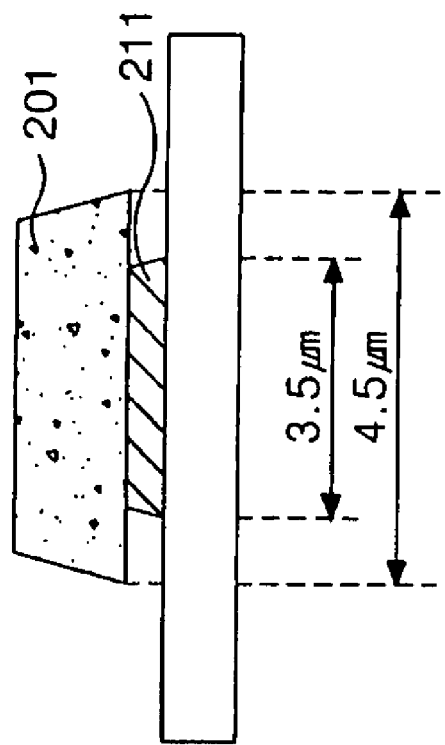
FIG. 4A illustrates a cross sectional view explaining the formation of an electrode using a related art tapered photo-resist pattern.

The tapered photo-resist pattern generally used in the related art manufacturing method typically has the bottom width wider than the upper width, as shown in FIG. 4A. For example, the conductive metal line may be formed by a wet etching method in which the line width of the photo-resist is 4.5 μm and the CD (Critical Dimension) loss, permissible tolerance of etching process, is 1 μm. In that case, the line width of the tapered photo-resist pattern 201 has the bottom width of 4.5 μm. Patterning the conductive metal line 211 with this photo-resist pattern, by the CD loss due to under-cut phenomena, the patterned line width of the conductive metal line 211 will be 3.5 μm. The CD loss is the process tolerance occurred in the etching process which is hard to control. Therefore, it is hard to control the line width by adjusting the CD loss. That is, for patterning the conductive metal line narrower than 3.5 μm, the width of the photo-resist should be formed less than 4.5 μm.

Figure 4B:
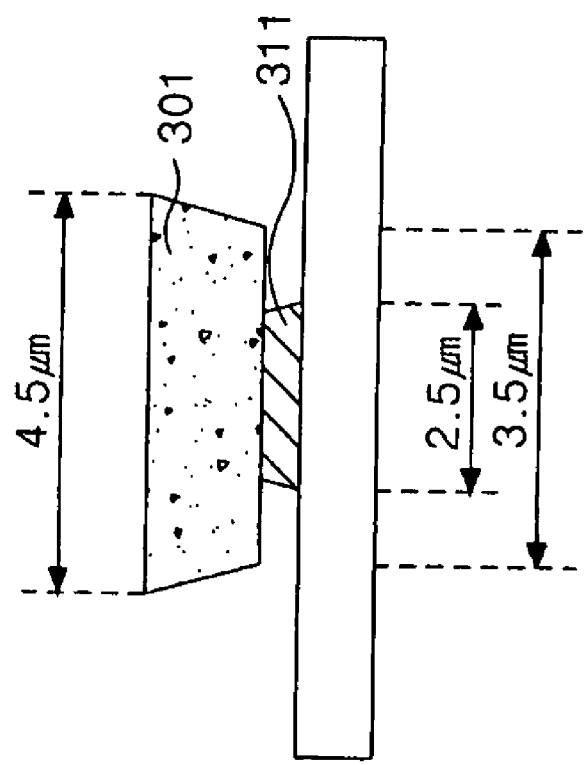
FIG. 4B illustrates a cross sectional view explaining formation of the electrode using a reverse tapered photo-resist pattern.

The reverse tapered photo-resist pattern used in the present invention has the bottom width more narrow than the upper width, as shown in FIG. 4B. Therefore, even when the line width of the photo-resist pattern 301 is formed to be about 4.5 μm, the bottom width of the photo-resist pattern 301 is narrower than 4.5 μm because of the reverse tapering. As the focus is increased and the exposure is increased, the bottom width of the reverse tapered photo-resist pattern is narrowed. Actually, adjusting the defocus and exposure amounts in the exposing process for patterning the photo-resist, the bottom of the reverse tapered photo-resist pattern is formed to have any one width value from about 2.5 μm to about 4.5 μm. Further, the bottom width of the reverse tapered photo-resist pattern can be formed more narrowly by controlling the temperature of the baking process after coating the photo-resist. Consequently, controlling the temperature in the backing process after depositing the photo-resist and adjusting the defocus and exposure amount in the exposing process, the bottom width of the reverse tapered photo-resist pattern can be one of about 2~4.5 μm. Etching the conductive metal layer 311 with the reverse tapered photo-resist pattern 301 having about 2~4.5 μm bottom width, considering the CD loss, the metal layer 311 can be patterned to have about 1.5~4.0 μm width. Thus, by adjusting the processing condition, CD loss can be controlled within about 1 μm to about 0.5 μm. As a result, using the reverse tapered photo-resist pattern, the metal pattern can be formed to have any one width from a very fine width (about 1.5 μm) to a photo-resist width of about 4.0 μm just by variously controlling the processing condition with the same photo-resist width precision.

In a method for fabricating the TFT array panel according to the present invention, the conductive patterns including the pixel electrode 118, the common electrode 122, the gate line 102 and the data line 104 can be formed to have any one width of about 1.5~4.0 μm by patterning in the etching process using the reverse tapered photo-resist pattern having about 4.5 μm line width.

Reducing the line widths of the pixel electrode 118 and the common electrode 122 formed in the pixel region by the same patterning dimension with the related art method, the aperture ratio of the pixel region can be increased. As a result, the brightness of the TFT array panel according to the present invention can be enhanced.

Additionally, as the line width of the conductive pattern is remarkably reduced, the pixel number can be increased proportional to the area corresponding to the reduced line width under the same aperture ratio condition. That is, with the same aperture ratio, the pixel number is increased and the TFT panel according to the present invention suggests a higher resolution panel.

Figure 5A:
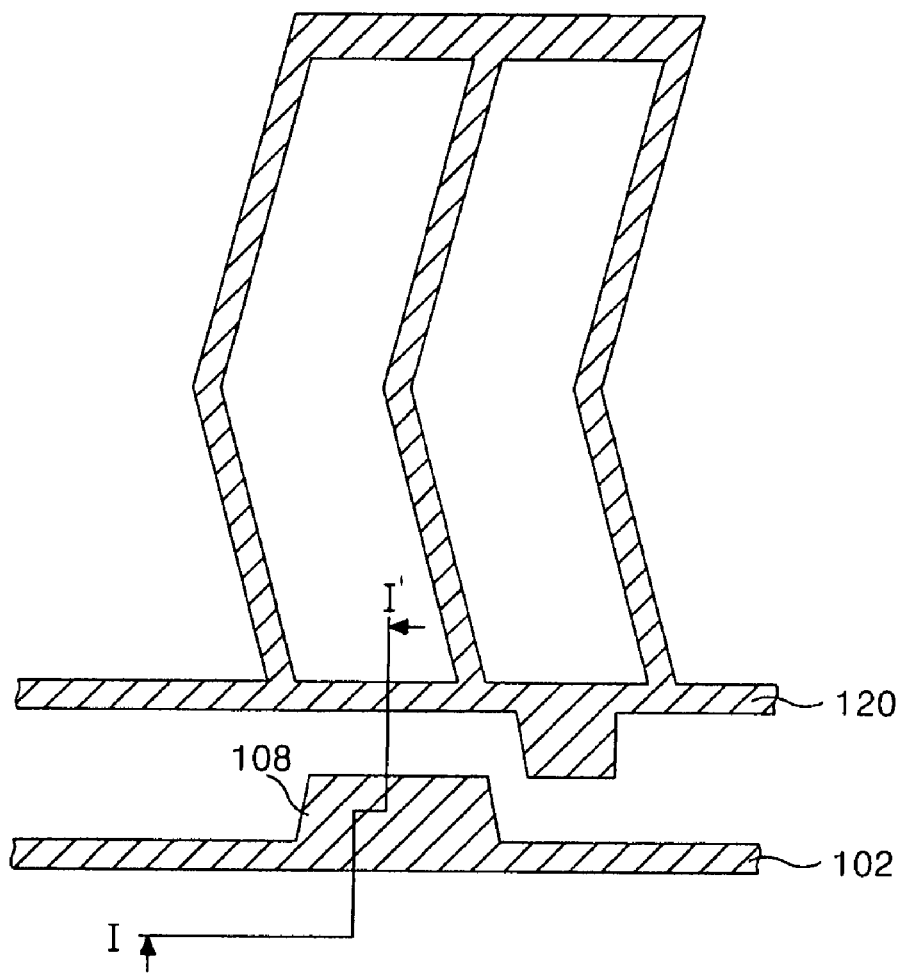
FIGS. 5A and 5B illustrate a plan view and a cross sectional view describing the first mask process of a method for fabricating a TFT array panel according to the first embodiment of the present invention.
Figure 5B:
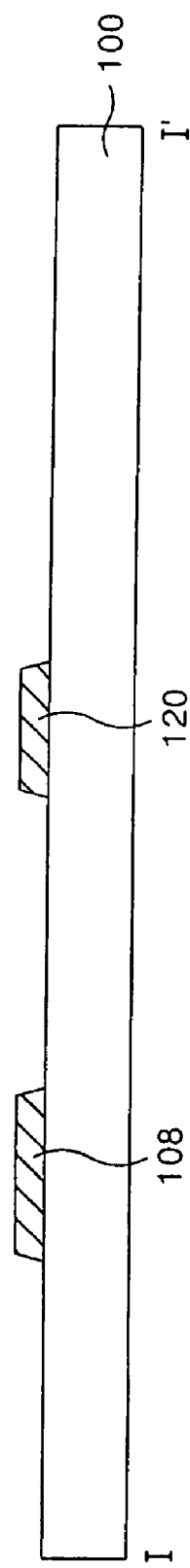

Referring to FIGS. 5A to 9B, a method for fabricating the TFT array panel including 5 mask processes according to the first embodiment of the present invention will be explained. FIGS. 5A and 5B illustrate the first mask process of the method for fabricating the TFT array panel. On the lower substrate 100, a gate line 102, a gate pad (not shown), a gate electrode (108), a common line 120 and a common electrode 122 are formed.

In detail, using a deposition process such as sputtering, a gate metal material is deposited on the whole surface of the lower substrate 100. Subsequently, in a photo-lithography process using a first mask, a reverse tapered photo-resist pattern is formed on the gate metal material, and then, in an etching process, the gate metal material is patterned with the reverse tapered photo-resist pattern as a mask. Then, the gate line 102, the gate pad at the end of the gate line 102, the gate electrode 108 connecting to the gate line 102, the common line 120 and the common electrode 122 connected to the common line 120 are formed. The gate metal material includes at least one of, for example, molybdenum (Mo), Titanium (Ti), Copper (Cu), Aluminum Neodium (AlNd), Chromium (Cr), Molybdenum alloy, Copper alloy or Aluminum alloy. As these conductive materials are non-transparent materials, in order to enhance the aperture ratio, these patterns are preferably formed using the reverse tapered photo-resist pattern as a mask to have finer line widths.

Figure 6A:
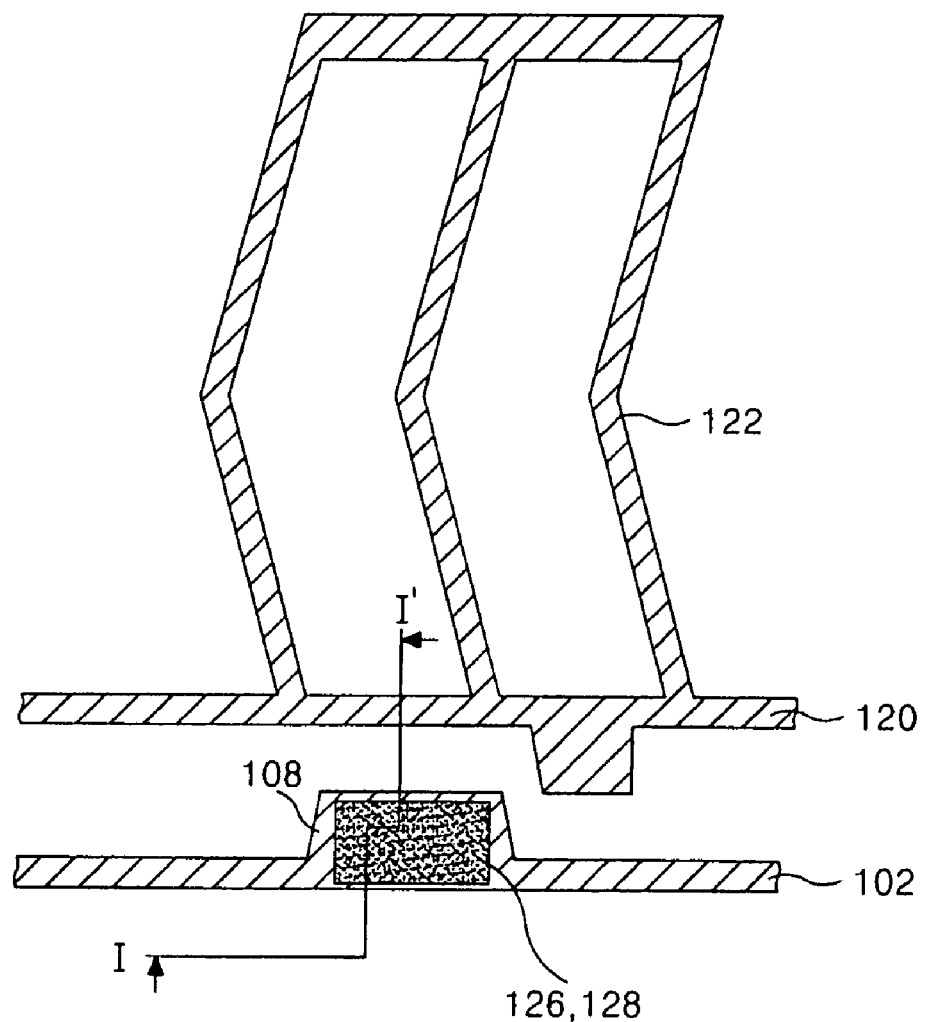
FIGS. 6A and 6B illustrate a plan view and a cross sectional view describing the second mask process of a method for fabricating a TFT array panel according to the first embodiment of the present invention.
Figure 6B:
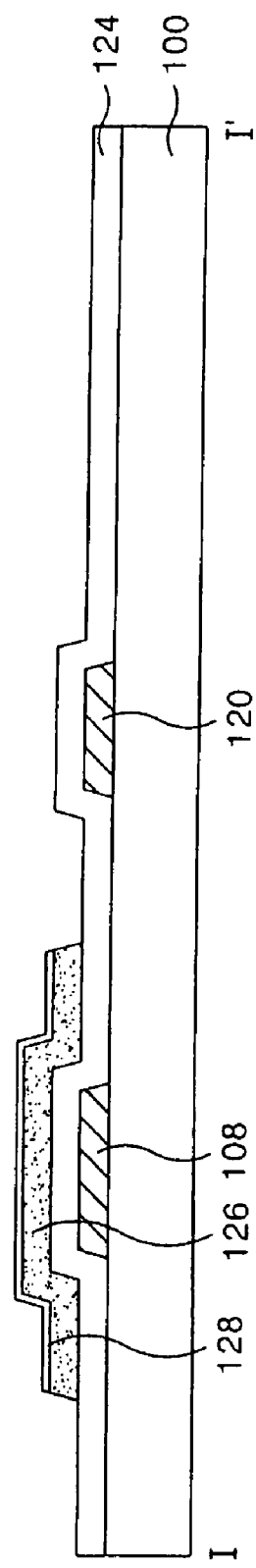

Referring to the FIGS. 6A and 6B, in the second mask process, an active layer 126 and an ohmic contact layer 128 are formed on the lower substrate 100 having the gate line 102, the gate pad, the gate electrode 108, the common line 120 and the common electrode 122. Using a depositing process such as a PECVD method, a gate insulating layer 124, an amorphous silicon layer and an impurity (n+ or p+) doped amorphous silicon layer are deposited on the lower substrate 100. Subsequently, in a photo-lithography process using the second mask, a reverse tapered photo-resist pattern is formed, and then in the etching process, the impurity doped amorphous silicon layer and the amorphous silicon layer are patterned using the reverse tapered photo-resist pattern as a mask. Then, the active layer 126 forms a channel of the TFT on the gate insulating 124 overlapping with the gate electrode 108 and the ohmic contact layer 128 overlapping with the active layer 126. The gate insulating layer includes the inorganic insulating material such as silicon oxide (SiOx) or silicon nitride (SiNx).

Figure 7A:
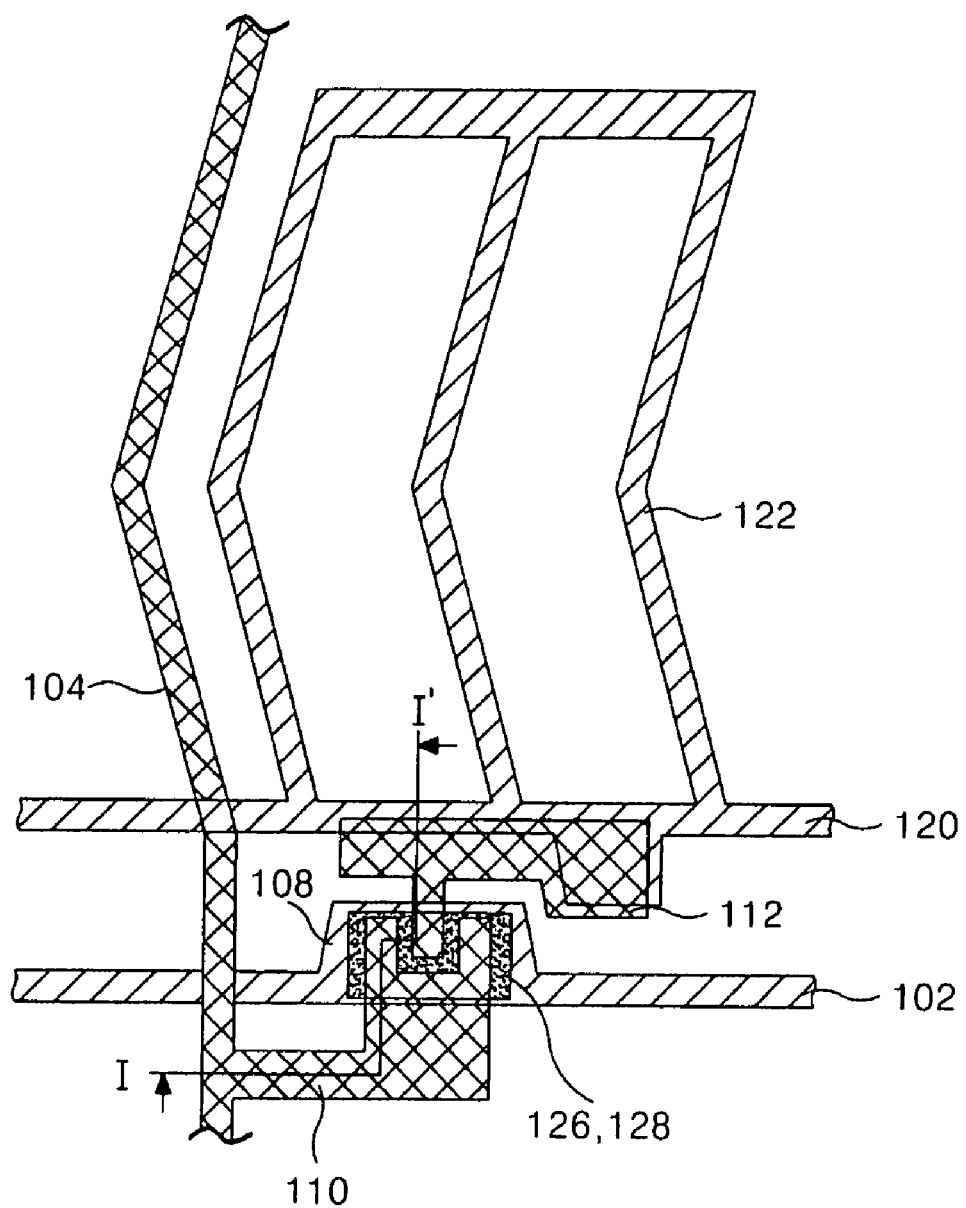
FIGS. 7A and 7B illustrate a plan view and a cross sectional view describing the third mask process of a method for fabricating a TFT array panel according to the first embodiment of the present invention.
Figure 7B:
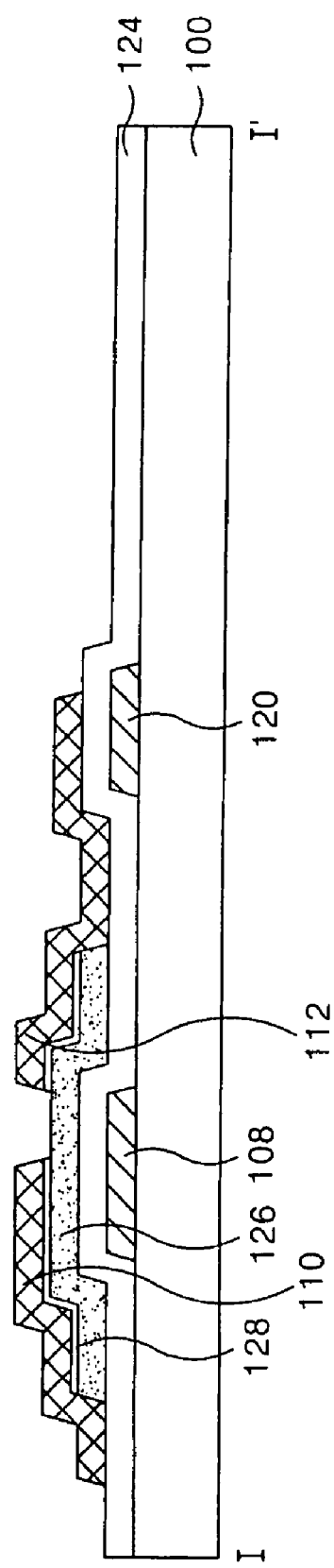

Referring to the FIGS. 7A and 7B illustrating the third mask process, a data line 104, a data pad (not shown), a source electrode 110 and a drain electrode 112 are formed on the lower substrate 100 having the active layer 126 and the ohmic contact layer 128. Using a depositing process such as a sputtering method, a source/drain metal layer is deposited on the whole surface of the lower substrate 100. Subsequently, in a photo-lithography process using the third mask, the reverse tapered photo-resist pattern is formed, and then in the etching process, the source/drain metal layer is patterned using the reverse tapered photo-resist pattern as a mask. Then, the data line 104 crossing with the gate line 102, the data pad at the end of the data line 104, the source electrode 110 connected to the data line 104 and the drain electrode 112 facing the source electrode 110. Here, some portions of ohmic contact layer 128 between the source electrode 110 and the drain electrode 112 are removed to complete the channel of the TFT. The source/drain metal includes at least one of molybdenum (Mo), Titanium (Ti), Copper (Cu), Aluminum Neodium (AlNd), Chromium (Cr), Molybdenum alloy, Copper alloy or Aluminum alloy. As these conductive materials are non-transparent materials, in order to enhance the aperture ratio, these patterns are preferably formed using the reverse tapered photo-resist pattern as a mask to have finer line widths.

Figure 8A:
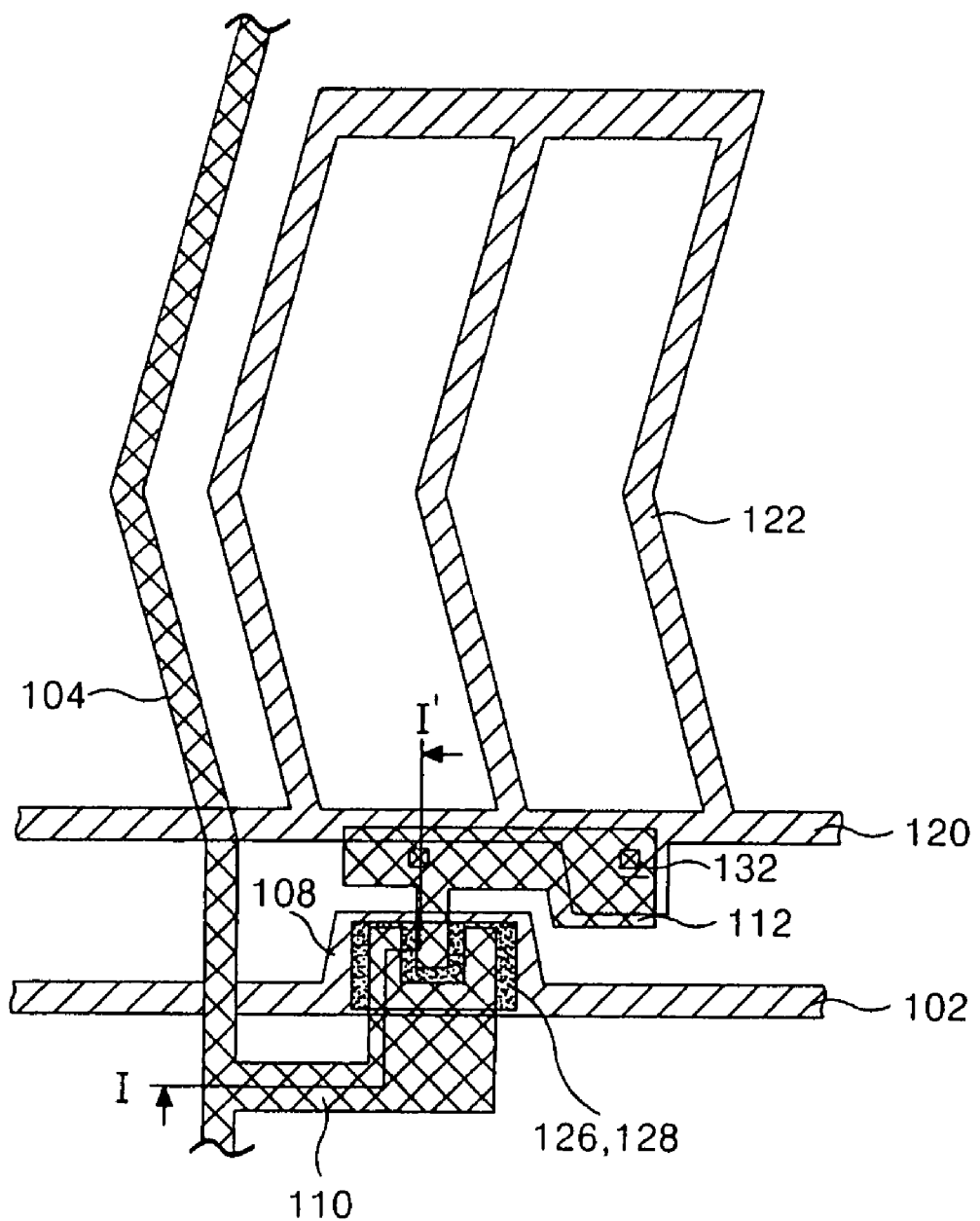
FIGS. 8A and 8B illustrate a plan view and a cross sectional view describing the fourth mask process of a method for fabricating a TFT array panel according to the first embodiment of the present invention.
Figure 8B:
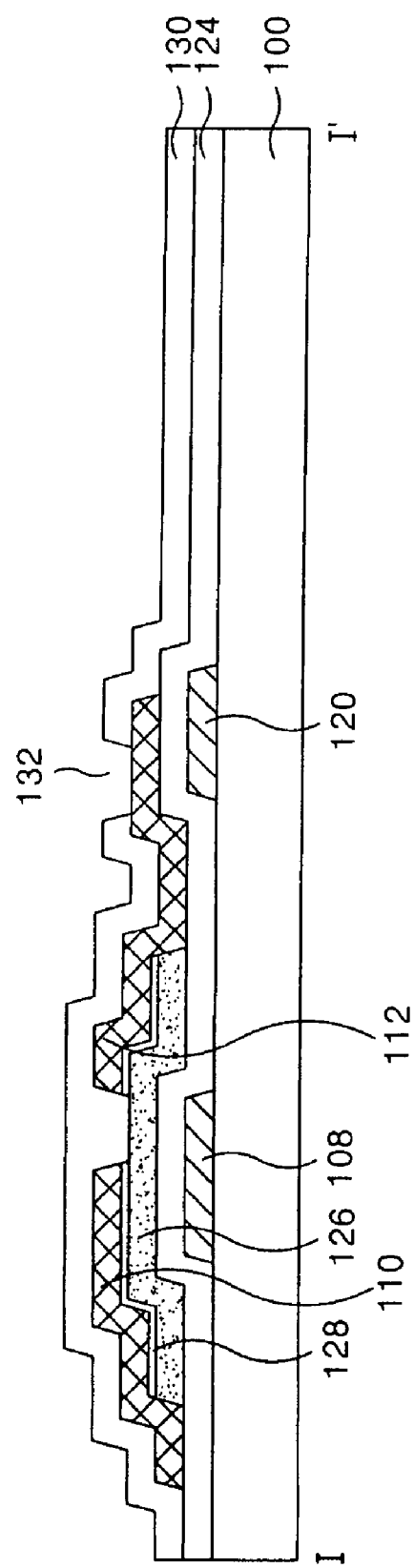

Referring to the FIGS. 8A and 8B illustrating the fourth mask process, a protective layer 130 is formed to cover the entire surface (except the pixel contact hole 132) of the lower substrate 100 having the data line 104, the data pad, the source electrode 110 and the drain electrode 112. In detail, the protective layer 130 is deposited on the whole surface of the lower substrate 100 using a deposition process such as the PECVD method. Subsequently, in the photo-lithography process using the fourth mask and the etching process, the pixel contact hole 132 exposes some portions of the drain electrode 112 by penetrating the protective layer 130. Here, a gate pad contact hole (not shown) exposes the gate pad at the end of the gate line 102 by penetrating the gate insulating layer 124 and the protective layer 130, and a data pad contact hole (not shown) exposes the data pad (not shown) at the end of the data line 104 by penetrating the protective layer 130 may be formed with the pixel contact hole 132.

Figure 9A:
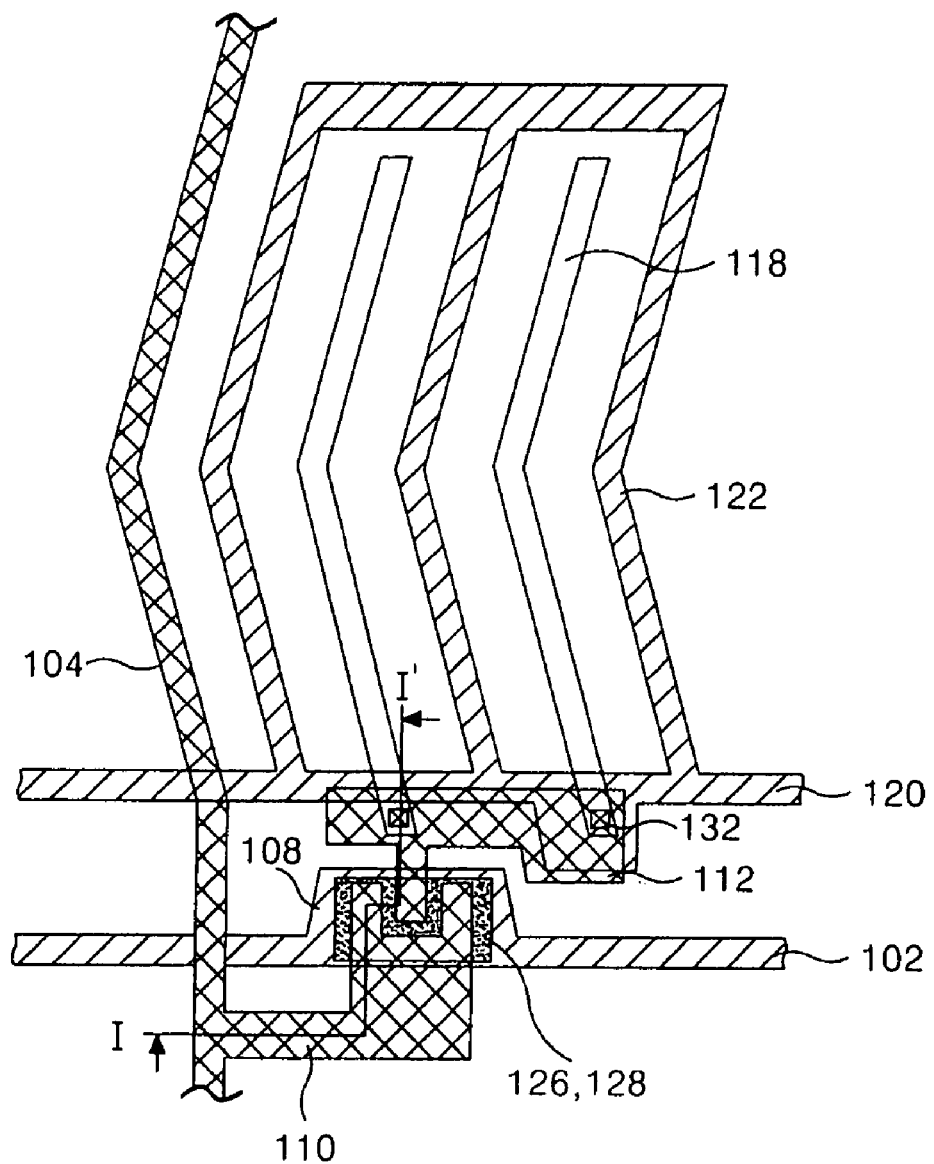
FIGS. 9A and 9B illustrate a plan view and a cross sectional view describing the fifth mask process of a method for fabricating a TFT array panel according to the first embodiment of the present invention
Figure 9B:
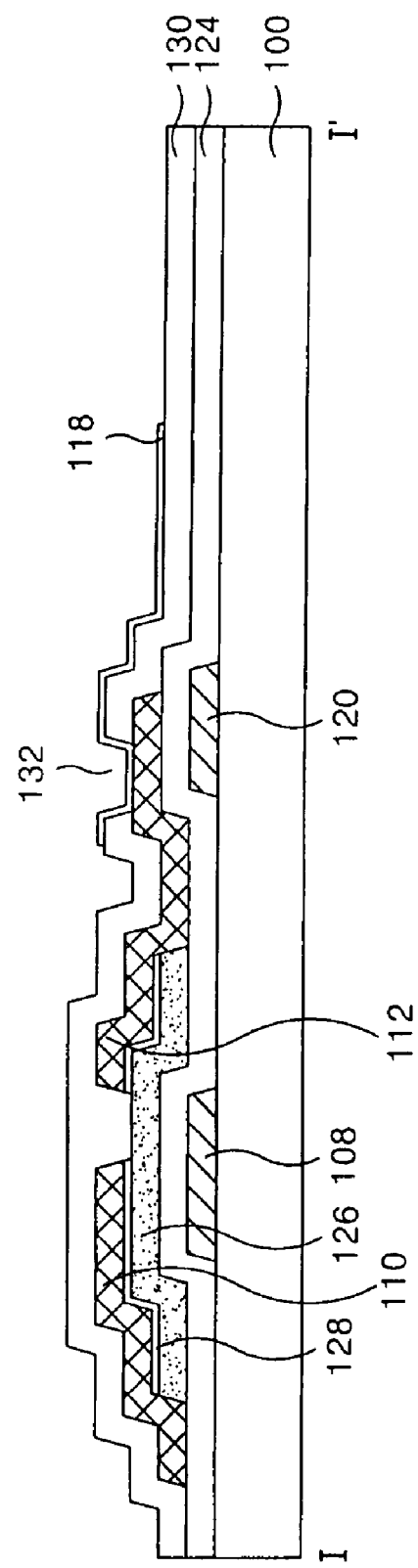

Referring to FIGS. 9A and 9B, in the fifth mask process, a pixel electrode 118 is formed on the lower substrate 100 having the protective layer 130. In detail, using a depositing process such as a sputtering method, a pixel material is deposited on the whole surface of the lower substrate 100. Subsequently, in the photo-lithography process using the fifth mask, the reverse tapered photo-resist pattern is formed, and then in the etching process, the pixel material is patterned. Then, the pixel electrode 118 is formed in the pixel region with contacting to the drain electrode 112 through the pixel contact hole 132 and being substantially parallel with the common electrode 122. The pixel material includes a transparent conductive material such as ITO (Indium Tin Oxide), IZO (Indium Zinc Oxide) or ITZO (Indium Tin Zinc Oxide). Further, the pixel material may include a non-transparent conductive material such as molybdenum (Mo), Titanium (Ti), Copper (Cu), Aluminum Neodium (AlNd), Chromium (Cr), Molybdenum alloy, Copper alloy or Aluminum alloy. When a non-transparent conductive material is included in the pixel material, in order to enhance the aperture ratio, the patterns are preferably formed using the reverse tapered photo-resist pattern as a mask to have finer line widths.

Figure 10A:
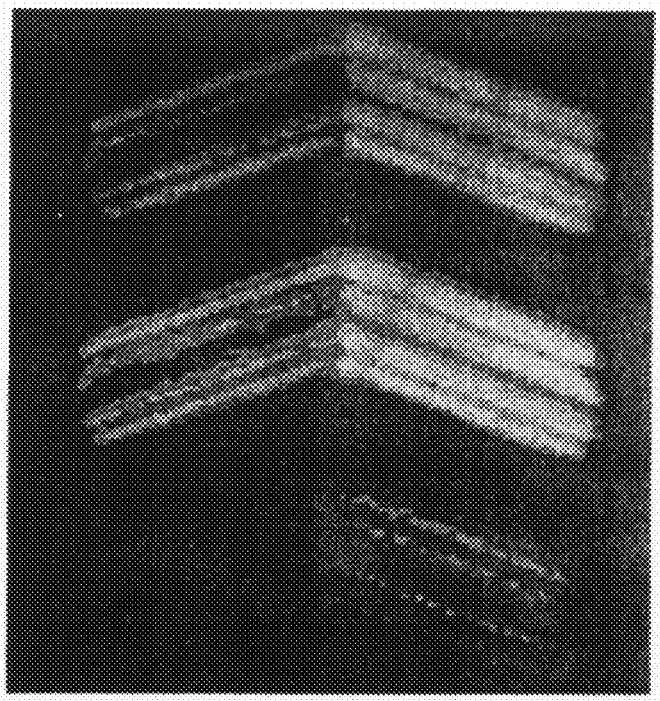
FIGS. 10A and 10B illustrate the brightness of the LCD according to the related art and the brightness of the LCD according to the present invention, respectively.
Figure 10B:
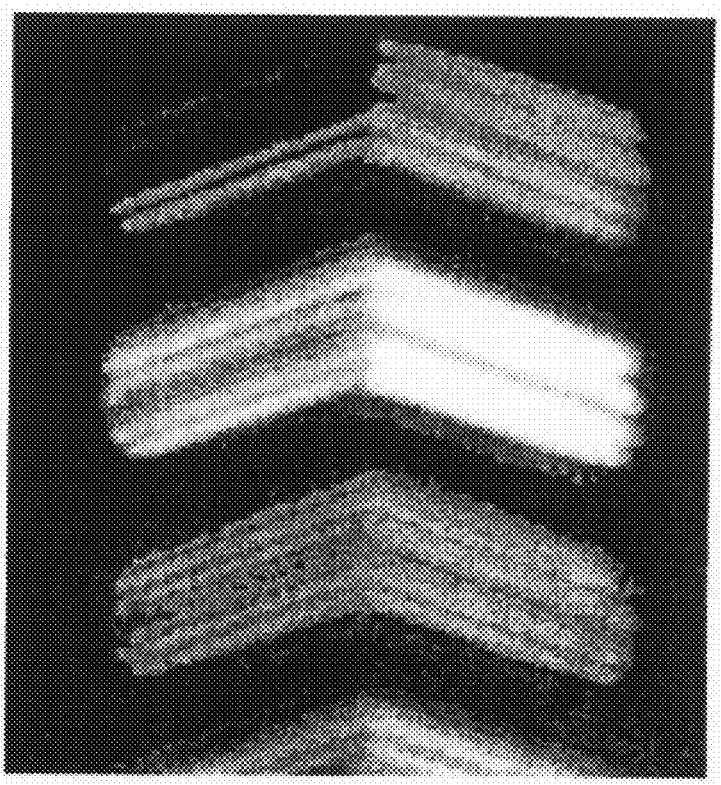

Based upon the above described method for fabricating the TFT array panel, the conductive patterns such as the pixel electrode 118, the common electrode 122, the gate line 102 and the data line 104 can be formed with about 1.5~4.0 μm line widths using the reverse tapered photo-resist pattern having the 4.5 μm line width. Therefore, the line widths of the pixel electrode 118 and the common electrode 122 formed in the pixel region can be reduced and then the aperture ratio can be increased. The brightness of the TFT array panel according to the present invention as shown in FIG. 10B is enhanced over than the brightness of the TFT array panel according to the related art as shown in FIG. 10A.

In the first embodiment, all conductive patterns including pixel electrode 118, common electrode 122, gate line 102 and data line 104 are formed using reverse tapered photo-resist patterns. Considering the main purpose of this invention is focused on to increase the aperture ratio of the pixel region, the reverse tapered photo-resist pattern is used just in the fifth mask process for making the pixel electrode 118.

Figure 11:
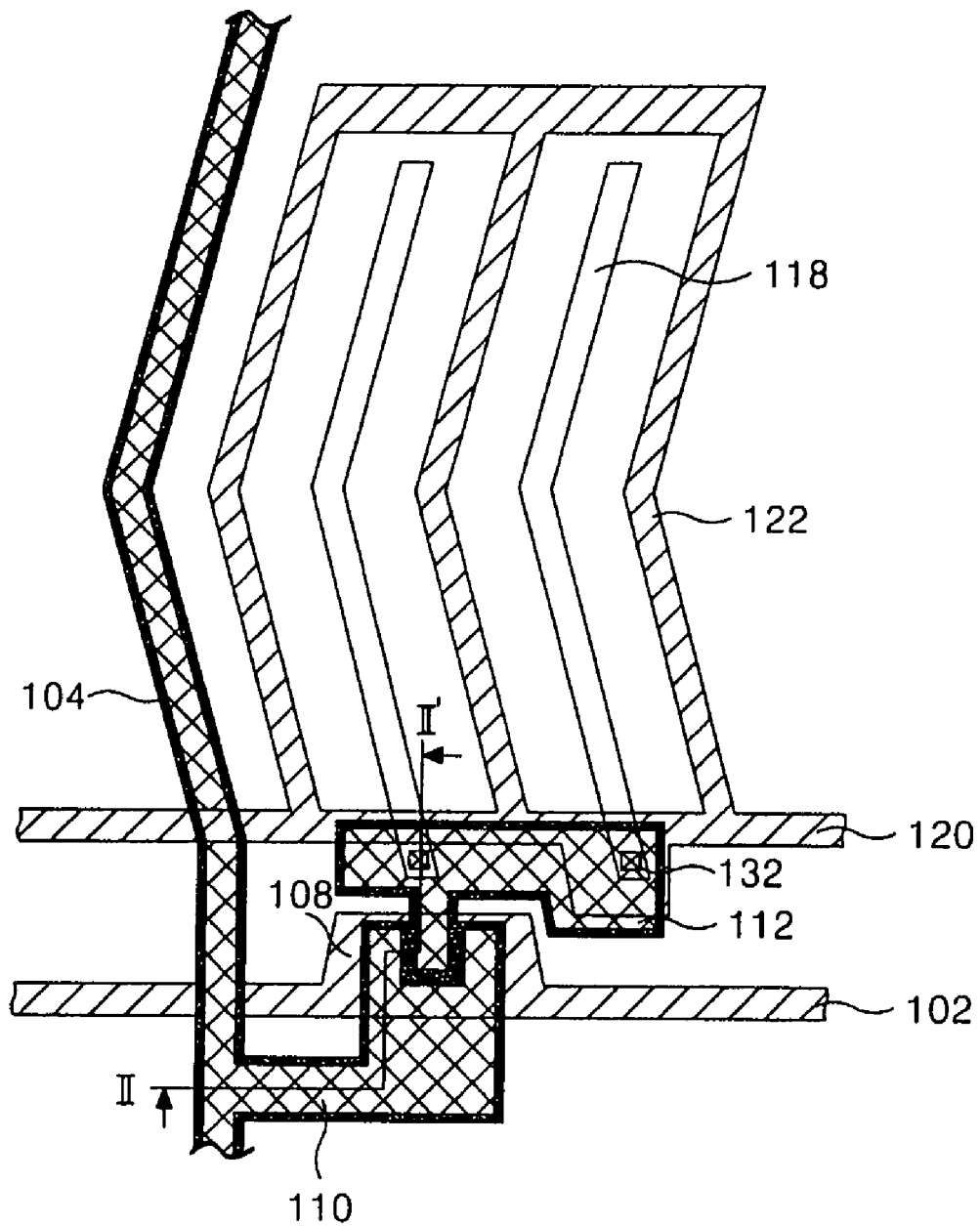
FIG. 11 illustrate a plan view of a TFT array panel according to the second embodiment of the present invention.
Figure 12:
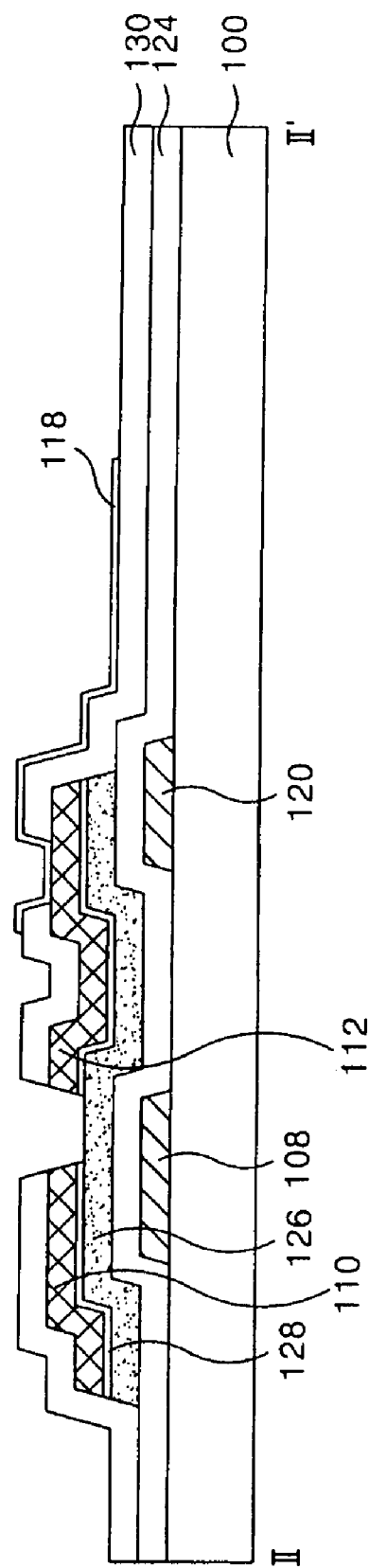
FIG. 12 illustrates a cross sectional view along the cutting line II-II' of the TFT array panel of FIG. 11 according to the second embodiment.

FIG. 11 illustrates the plan view of the TFT array panel according to the second embodiment of the present invention. FIG. 12 illustrates the cross sectional view along the cutting line II-II' of FIG. 11 according to the second embodiment of the present invention. Referring to FIGS. 11 and 12, the TFT array panel according to the second embodiment is the same as that of the first embodiment except that the active layer 126 and the ohmic contact layer 128 are formed to have substantially the same size as the data line 104, the source electrode 110 and the drain electrode 112. Referring to the FIGS. 13A to 16B, a method for fabricating the TFT array panel with fourth mask processes according to the second embodiment of the present invention will be explained.

Figure 13A:
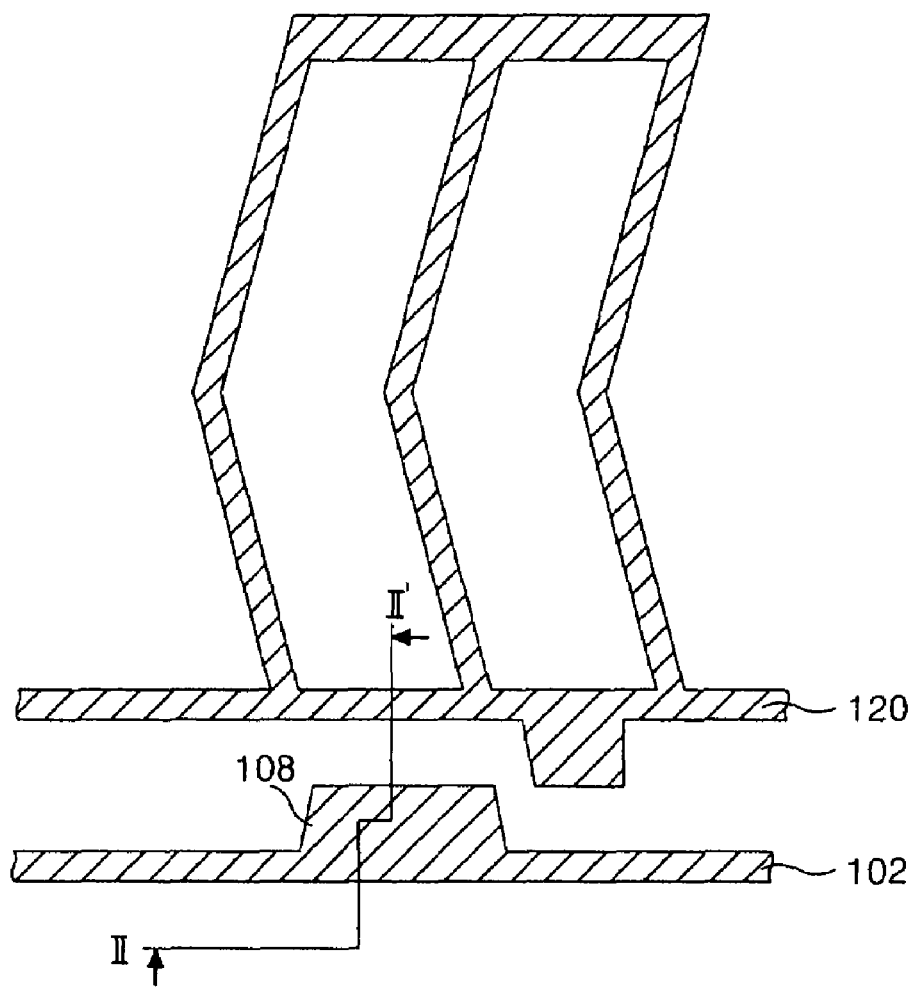
FIGS. 13A and 13B illustrate a plan view and a cross sectional view describing the first mask process of a method for fabricating a TFT array panel according to the second embodiment of the present invention.
Figure 13B:
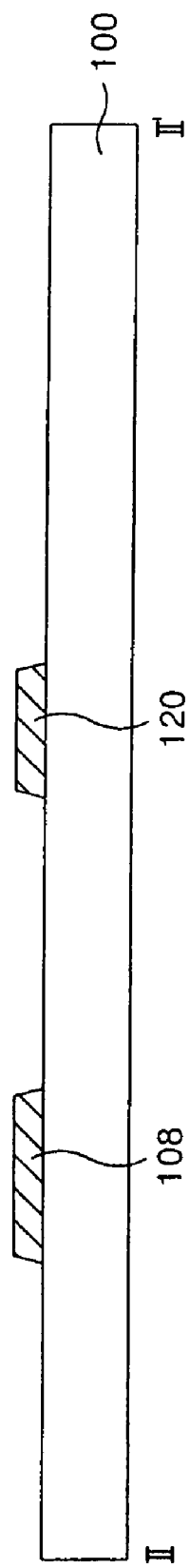

Referring to the FIGS. 13A and 13B, in the first mask process, a gate line 102, a gate pad (not shown), a gate electrode 108, a common line 120 and a common electrode 122 are formed on a lower substrate 100. Using a deposit process such as a sputtering method, a gate metal layer is deposited on the whole surface of the lower substrate 100. Subsequently, in a photo-lithography process using the first mask, a reverse tapered photo-resist pattern is formed on the gate metal layer, and then, in an etching process, the gate metal layer is patterned using the reverse tapered photo-resist pattern as a mask. Then, the gate line 102, the gate pad at the end of the gate line 102, the gate electrode 108 connected to the gate line 102, the common line 120 and the common electrode 122 connected to the common line 120 are formed.

Figure 14A:
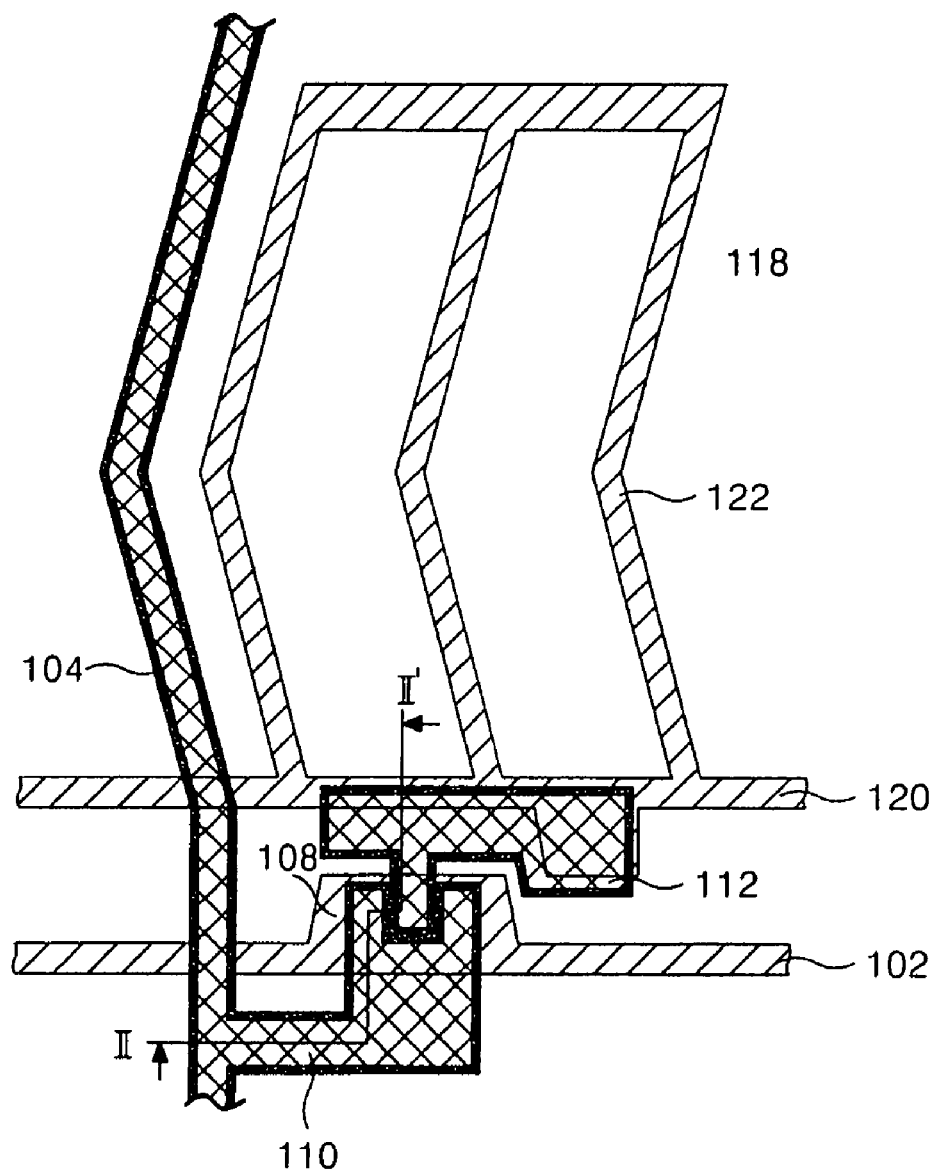

Referring to the FIGS. 14A and 14B, in the second mask process, an active layer 126, an ohmic contact layer 126, a data line 104, a data pad (not shown) and a source-drain pattern 110a not separated but formed in one pattern on the lower substrate 110 having the gate line 102, the gate pad, the gate electrode 108, the common line 120 and the common electrode 122. Using a depositing process such as a PECVD method, a gate insulating layer 124, an amorphous silicon layer and an impurity doped (n+ or p+) amorphous silicon layer are deposited on the whole surface of the lower substrate 100. Sequentially, using the sputtering method, a source/drain metal layer is deposited thereon. Subsequently, in the photo-lithography process using the second mask, a reverse tapered photo-resist pattern is formed, and then in the etching process, the source/drain metal layer, the impurity doped amorphous silicon layer and the amorphous silicon layer are patterned by the reverse tapered photo-resist pattern as a mask. Then, the data line 104 crossing the gate line and the data pad at the end of the data line 104 are formed. Further, the source-drain pattern 110a which will be separated into the source electrode connecting to the data line 104 and the drain electrode facing with the source electrode is formed. Under the source-drain pattern 110a, there are the active layer 126 forming the channel between the source electrode and drain electrode, and the ohmic contact layer 128 for reducing the contact resistance between the active layer 126 and the source-drain electrodes. At this time, the data line and source-drain pattern 110a, the active layer 126 and the ohmic contact layer 128 have the same shape because they are patterned at the same time with the same mask.

Figure 15A:
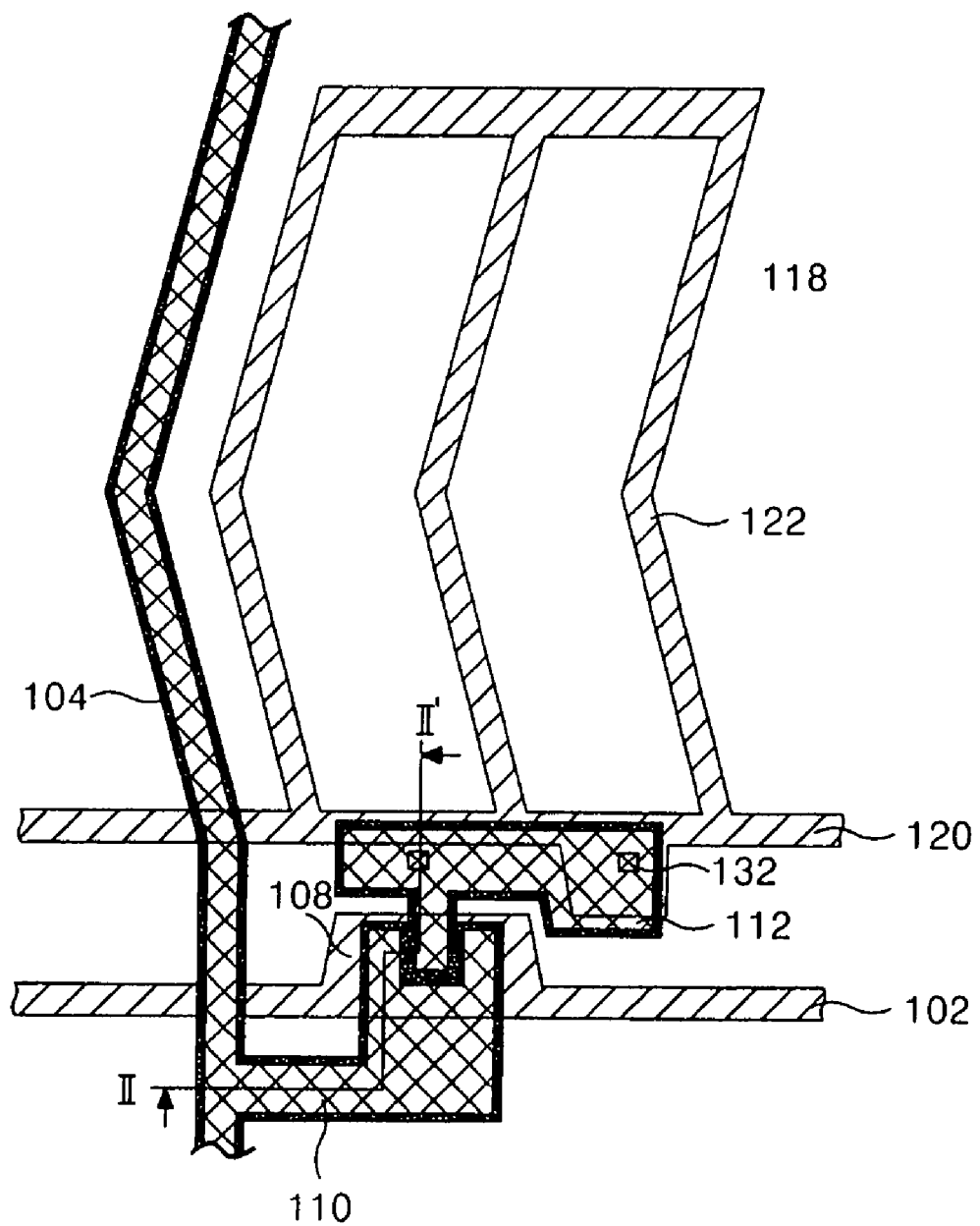
FIGS. 15A and 15B illustrate a plan view and a cross sectional view describing the third mask process of a method for fabricating a TFT array panel according to the second embodiment of the present invention.
Figure 15B:
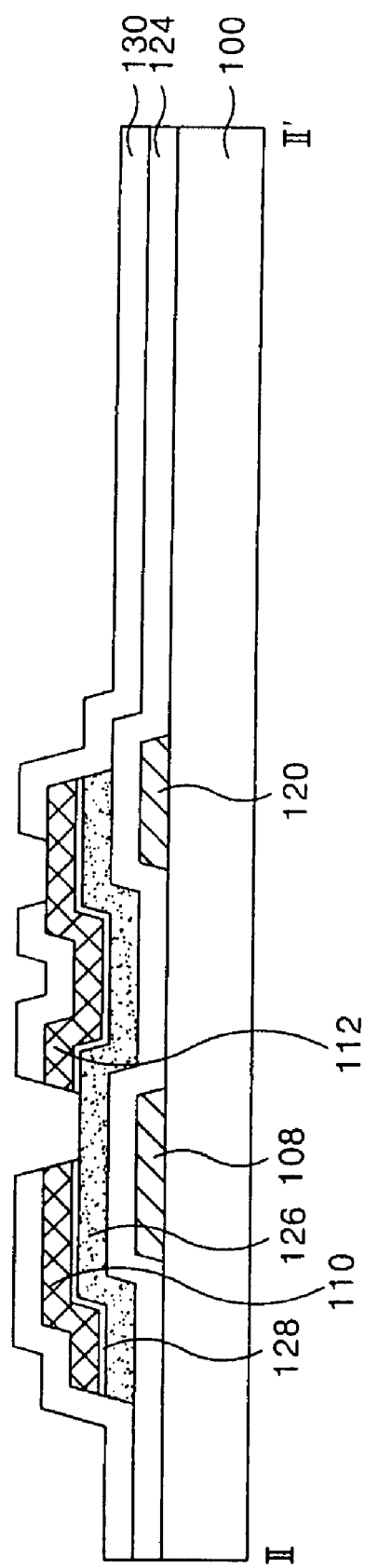

Referring to the FIGS. 15A and 15B, in the third mask process, a protective layer 130 covers the whole surface of the lower substrate 100 (except a pixel contact hole 132 and a channel of the TFT) including the data line 104, data pad, source electrode 110 and drain electrode 112. The protective layer 130 is deposited on the whole surface of the lower substrate 100 using a PECVD method. Subsequently, a photo-lithography process and etching process using the third mask process, the pixel contact hole 132 exposing some portions of the drain electrode 112 by penetrating the protective layer 130. Further, the source electrode 110 and the drain electrode 112 are separated. And then, the exposed ohmic contact layer 128 between the source electrode 110 and the drain electrode 112 should be removed by oxidizing with oxygen plasma to complete the channel layer. Then, the TFT is completely formed. Here, a gate pad contact hole (not shown) exposing the gate pad at the end of the gate line 102 by penetrating the gate insulating layer 124 and the protective layer 130, and a data pad contact hole (not shown) exposing the data pad (not shown) at the end of the data line 104 by penetrating the protective layer 130 may be formed with the pixel contact hole 132.

Figure 16A:
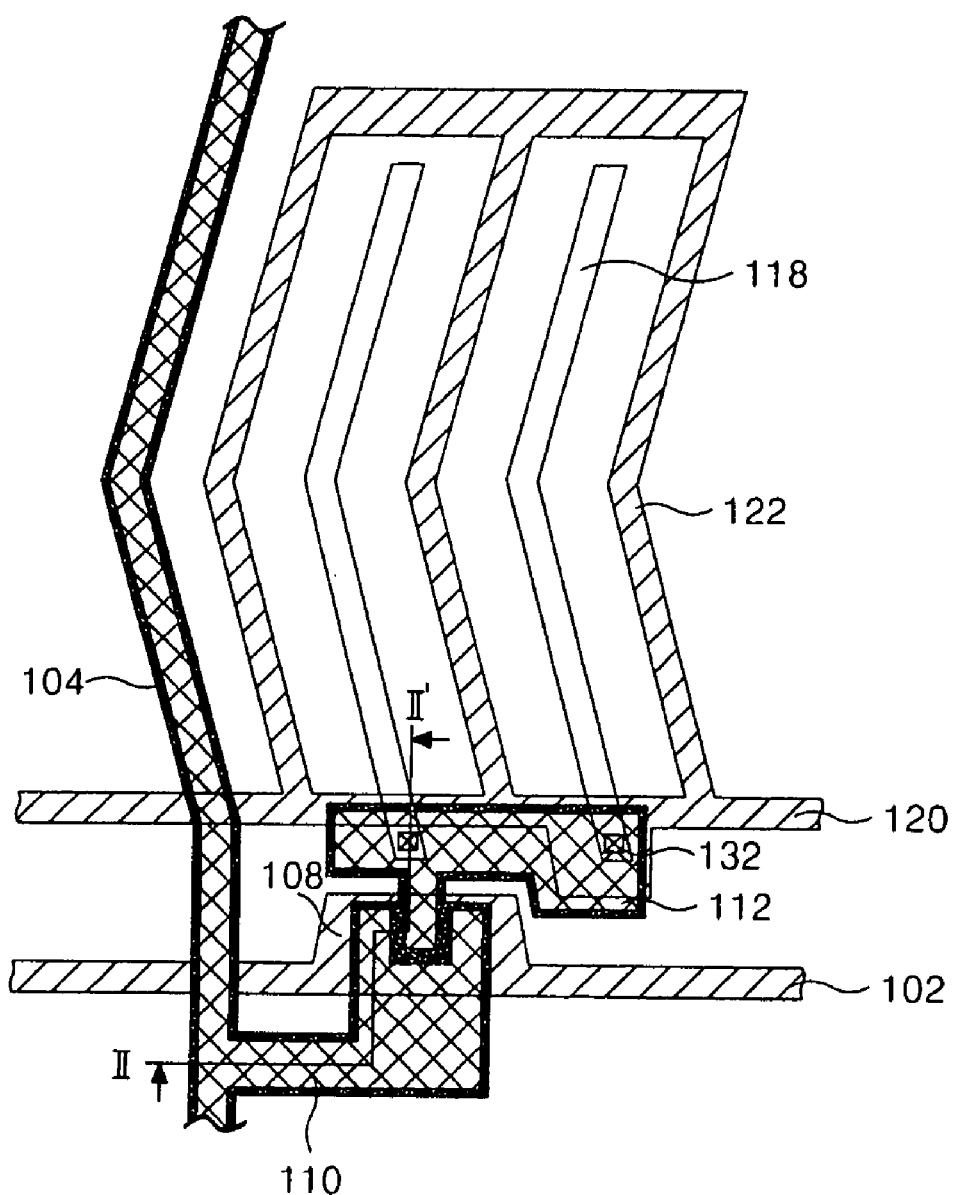
FIGS. 16A and 16B illustrate a plan view and a cross sectional view describing the fourth mask process of a method for fabricating a TFT array panel according to the second embodiment of the present invention.
Figure 16B:
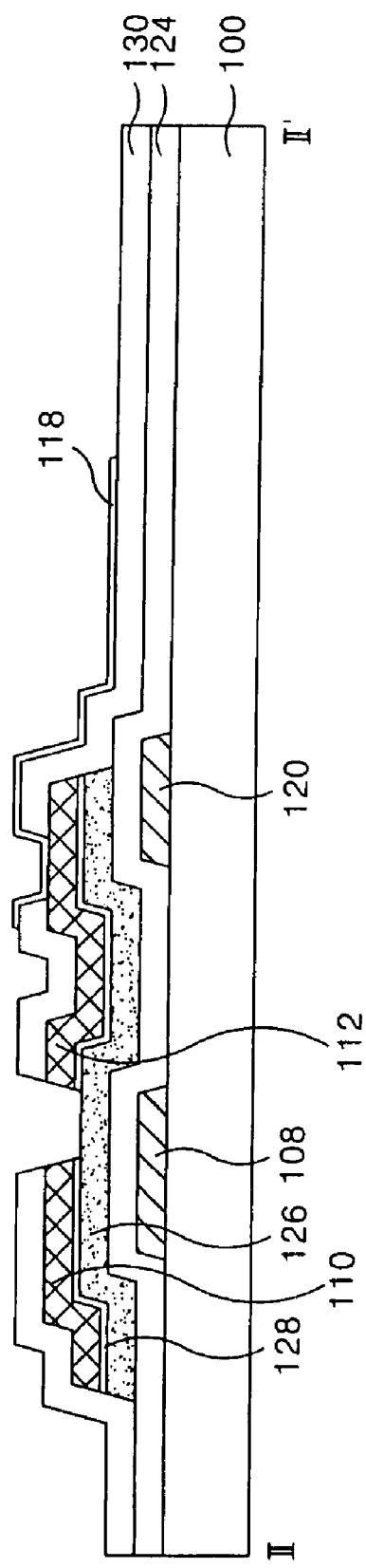

Referring to FIGS. 16A and 16B, in the fourth mask process, a pixel electrode 118 is formed on the lower substrate 100 having the protective layer 130. Using a depositing process such as sputtering method, a pixel material is deposited on the whole surface of the lower substrate 100. Subsequently, in the photo-lithography process using the fourth mask, a reverse tapered photo-resist pattern is formed, and then in the etching process, the pixel material is patterned with the reverse tapered photo-resist pattern as a mask. Then, the pixel electrode 118 is formed in the pixel region. The pixel electrode contacts the drain electrode 112 through the pixel contact hole 132 and is substantially parallel to the common electrode 122.

The method for fabricating the TFT array panel according to the second embodiment of the present invention uses four mask processes so that the manufacturing price can be reduced. Further, the present invention does not use a half tone mask or refraction mask, which are relatively high in price, to reduce the mask process number for manufacturing the TFT array panel so that it can more save the fabricating price.

In the first and the second embodiments, the present invention is applied to an IPS mode LCD device in which the pixel electrode 118 and the common electrode 122 are formed on the lower substrate 100. However, the features of the present invention can be applied to a vertical electric field type LCD panel in which the pixel electrode is formed on the lower substrate and the common electrode is formed on the upper substrate facing the lower substrate. When the conductive patterns are formed in the vertical electric field type LCD by using the reverse tapered photo-resist pattern, the gate line and the data line are formed using the reverse tapered photo-resist pattern. Because, in the vertical electric field type LCD, the common electrode is made of transparent conductive material and formed by depositing on the whole surface of the upper substrate, it is not required to reduce the width of the common electrode. Further, the pixel electrode is generally transparent conductive material.

In the method for fabricating the TFT array panel according to the present invention, the conductive patterns including the pixel electrode, common electrode, gate line and data line are formed using the reverse tapered photo-resist pattern. Therefore, the TFT array panel according to the present invention enhances the aperture ratio of the pixel region because the line widths of the pixel electrode and the common electrode can be reduced. Further the brightness of the TFT array panel according to the present invention is also enhanced.

Additionally, without enhancing the aperture ratio, the pixel number can be increased by disposing more pixels at the area increased by reducing the widths of the conductive lines which include the pixel electrode, common electrode, gate line and data line. Using the present invention, it is possible to enhance the aperture ratio and the brightness of the TFT array panel or to increase the pixel number to configure a higher resolution display panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display device, comprising:
    forming a gate line, a gate electrode connected to the gate line, a common electrode and a common line connected the common electrode on a substrate in a first mask process;
    depositing a gate insulating layer on the substrate to cover the gate line, the gate electrode and the common electrode;
    forming an active layer on the gate insulating layer, the active layer overlapping the gate electrode to form a channel layer, and forming an ohmic contact layer on the active layer, a data line crossing with the gate line to define a pixel region and a source-drain pattern connected to the data line in a second mask process;
    depositing a protective layer over the data line, the source electrode and the drain electrode;
    patterning the source-drain pattern to form a source electrode and a drain electrode, completing the channel layer by removing a portion of the ohmic contact layer between the source electrode and the drain electrode, and forming a pixel contact hole exposing the drain electrode by penetrating the protective layer in a third mask process; and
    forming a pixel electrode that generates a horizontal electric field with the common electrode in the pixel region, wherein the pixel connects electrode to the drain electrode through the pixel contact hole in a fourth mask process using a reverse tapered photo-resist pattern,
    wherein the pixel electrode and the common electrode are formed in a zigzag shape while the data line is formed in a liner line shape,
    wherein a conductive line patterns of the substrate such as the pixel electrode, the common electrode, the gate line and the data line are formed with the reverse tapered photo-resist pattern,
    wherein at least one of the pixel electrode, common electrode, the gate lien, the data line and the common line has a line width of about 1.5~4.0 µm.

2. The method for fabricating a liquid crystal display device according to the claim 1, wherein the reverse tapered photo-resist pattern is formed by steps of:

depositing photo-resist on the substrate;

baking the photo-resist with controlling temperature for the photo-resist pattern to have reverse tapered shape and;

exposing the photo-resist with adjusting defocus amount and exposure amount for patterning the photo-resist to have reverse tapered shape.

* * * * *